(12) United States Patent  (10) Patent No.: US 7,651,051 B2
Agrawal et al.  (45) Date of Patent: Jan. 26, 2010

(54) MECHANISM FOR BIAXIAL ROTATION OF A WING AND VEHICLE CONTAINING SUCH MECHANISM

(75) Inventors: Sunil K. Agrawal, Newark, DE (US); Sean H. McIntosh, Drexel Hill, PA (US); Zaeem Khan, Glenville, NY (US)

(73) Assignee: University of Delaware, Newark, DE (US)

( * ) Notice: Subject to any disclaimer, the term of this patent is extended or adjusted under 35 U.S.C. 154(b) by 333 days.

(21) Appl. No.: 11/593,863

(22) Filed: Nov. 7, 2006

(65) Prior Publication Data

US 2007/0262194 A1 Nov. 15, 2007

Related U.S. Application Data

(60) Provisional application No. 60/734,606, filed on Nov. 8, 2005.

(51) Int. Cl.
*B64C 33/02* (2006.01)
(52) U.S. Cl. ........................................................ 244/22
(58) Field of Classification Search .................... 244/11, 244/22, 28, 72; 416/66, 83; 446/35
See application file for complete search history.

(56) References Cited

U.S. PATENT DOCUMENTS

| | | | |
|---|---|---|---|
| 5,899,408 A | 5/1999 | Bowers, Jr. | |
| 6,206,324 B1 | 3/2001 | Smith | |
| 6,568,634 B2 | 5/2003 | Smith | |
| 6,659,397 B1 | 12/2003 | Charron | |
| 6,802,473 B2 | 10/2004 | Charron | |
| 2004/0195436 A1 | 10/2004 | Sinclair | |

FOREIGN PATENT DOCUMENTS

WO  WO 2004/112929  12/2004

OTHER PUBLICATIONS

International Search Report for International Application No. PCT/US06/43294 mailed Jun. 24, 2008.
Khan, Zaeem A.; Agrawal, Sunil K.; "Modeling and Simulation of Flapping Wing Micro Air Vehicles," 2005 ASME Interational Design Engineering Technical Conferences; Sep. 24-28, 2005; pp. 1-9; Long Beach, CA.

(Continued)

*Primary Examiner*—Rob Swiatek
(74) *Attorney, Agent, or Firm*—RatnerPrestia

(57) ABSTRACT

A vehicle with wings and a mechanism for causing a flapping motion in wings. Each wing structure comprises a wing and a wing spar coupled to a follower via a resilient member. Each wing carrier is pivotally connected to the body and is configured to restrain lateral movement and permit rotation of the wing spar about a feathering axis. A biasing member provides torsional bias to each wing spar. A linkage, driven by an actuator, transmits cyclic motion that rotates the wing carrier about a flapping axis, which moves the follower along a follower path. A guide attached to the vehicle body lies in the path of each follower, and the follower and guide are shaped such that each wing spar has a first rotational position about its axis along a first portion of the follower path and a second rotational position along a second portion of the follower path.

9 Claims, 9 Drawing Sheets

OTHER PUBLICATIONS

McIntosh, Sean H.; Agrawal, Sunil K; Kahn, Zaeem; "Design of a Mechanism for Biaxial Rotation of a Wing for a Hovering Vehicle," IEEE/ASME Transactions on Mechatronics; Apr. 2006; pp. 145-153; vol. 11, No. 2.

Khan, Zaeem A.; Agrawal, Sunil K.; "Design of Flapping Mechanisms Based on Transverse Bending Phenomena in Insects," Proceedings of the 2006 IEEE International Conference on Robotics and Automation; May 2006; pp. 2323-2328; Orlando, Florida.

Madangopal, Rajkiran; Khan, Zaeem Ashraf; Agrawal, Sunil K.; "Energetics-Based Design of Small Flapping-Wing Micro Air Vehicles," IEEE/ASME Transactions on Mechatronics; Aug. 2006; pp. 433-438; vol. 11, No. 4.

Madangopal, Rajkiran; Khan, Zaeem A.; Agrawal, Sunil K.; "Biologically Inspired Design of Small Flapping Wing Air Vehicles Using Four-Bar Mechanisms and Quasi-steady Aerodynamics," Journal of Mechanical Design; Jul. 2005; pp. 809-816; vol. 127.

Banala, Sai K.; Agrawal, Sunil K.; "Design and Optimization of a Mechanism for Out of Plane Insect Wing Like Motion with Twist,"; Journal of Mechanical Design; Jul. 2005, vol. 3, Issue 4; pp. 841-844.

Khan, Zaeem A.; Agrawal, Sunil K.; "Force and Moment Characterization of Flapping Wings for Micro Air Vehicle Application"; Procedings of the 2005 American Control Conference; Jun. 8, 2005, vol. 3; pp. 1515-1520.

Delaurier, J.D.; "An Aerodynamic Model for Flapping-Wing Flight," The Aeronautical Journal of the Royal Aeronautical Society; Apr. 1993; pp. 125-130.

Delaurier, J.D.; Harris, J.M.; "A study of Mechanical Flapping-Wing Flight," The Aeronautical Journal of the Royal Aeronautical Society; Oct. 1993; pp. 277-286.

Delaurier, J.D.; "The Development and Testing of a Full-Scale Pioted Ornithopter," Canadian Aeronautics and Space Journal; Jun. 1999; pp. 72-82; vol. 45, No. 2.

Sitti, Metin; "PZT Actuated Four-Bar Mechanism with Two Flexible Links for Micromechanical Flying Insect Thorax"; IEEE International Confrence on Robotics and Automation; 2001, vol. 4; pp. 3893-3900.

Ellington, C.P.; "The Novel Aerodynamics of Insect Flight: Applications to Micro-Air Vehicles"; The Journal of Experimental Biology; 1999, vol. 202; pp. 3439-3448.

Waszak, Martin R.; Davidson, John B.; Ifju, Peter G.; "Simulation and Flight Control of an Aeroelastic Fixed Wing Micro Aerial Vehicle"; AIAA Atmospheric Flight Mechanics Conference; Aug. 5-8, 2002.

Grasmeyer, Joel M.; Keennon, Matthew T.; "Development of the Black Widow Micro Air Vehicle"; American Institute of Aeronautics and Astronautics; 2001.

Wood, R.J.; Avadhanula, S.; Menon, M.; Fearing, R.S.; "Microrobotics Using Composite Materials: The Micromechanical Flying Insect Thorax"; IEEE International Conference on Robotics and Automation; Sep. 2003, vol. 2; pp. 1842-1849.

Sane, Sanjay P.; Dickinson, Michael H.; "The Aerodynamic Effects of Wing Rotation and a Revised Quasi-Steady Model of Flapping Flight"; The Journal of Expermental Biology; 2002, vol. 205; pp. 1087-1096.

Pornsin-Sirirak, T. Nick; Lee, S.W.; Nassef, H.; Grasmeyer, J.; Tai, Y.C.; Ho, C.M.; Keennon, M.; "MEMS Wing Technology for a Battery-Powered Ornithoter"; The $13^{th}$ Annual IEEE Annual International Conference on MEMS; Jan. 23-27, 2000; pp. 709-804.

Avadhanula, S.; Wood, R.J.; Campolo, D.; Fearing, R.S.; "Dynamically Tuned Design of the MFI Thorax"; IEEE International Conference on Robotics and Automation; 2002. vol. 1; pp. 52-59.

Yan, J.; Wood, R.J.; Avadhanula, S.; Sitti, M.; Fearing, R.S.; "Towards Flapping Wing control for a Micromechanical Flying Insect"; IEEE International Conference on Robotics and Automation; 2001, vol. 4; pp. 3901-3908.

McDonald, Matthew P.; "Design of Flapping-Wing Micro Aerial Vehicles Motivated by Hawkmoths and Humming Birds"; Thesis submitted to University of Delaware; Spring 2005.

MECHANISM FOR BIAXIAL ROTATION OF A WING AND VEHICLE CONTAINING SUCH MECHANISM

CROSS REFERENCE TO RELATED APPLICATIONS

This application claims priority from U.S. Provisional Patent Application Ser. No. 60/734,606, filed Nov. 8, 2005, incorporated herein by reference.

GOVERNMENT FUNDING

The U.S. Government has a paid-up license in the present invention and the right in limited circumstances to require the patent owner to license others on reasonable terms as provided for by contract as awarded by the Army Research Office under Grant #W911NF-05-1-0066.

BACKGROUND OF THE INVENTION

In recent years, there has been a demand to reduce the size of unmanned air vehicles. The Defense Advanced Research Projects Agency (DARPA) defines the class of air vehicles measuring 15 cm or less in any dimension as micro air vehicles (MAVs). Possible applications of these vehicles range from civilian and military surveillance to search and rescue operations. Numerous research groups are actively developing designs of new MAVs. Examples of MAVs include the Black Widow, developed by AeroVironment Inc., and the University of Florida's flexible wing design. Like the majority of MAVs, the above examples comprise scaled-down versions of larger traditional flying vehicles with fixed or rotary wings. Unfortunately, the Reynolds number and the aerodynamic lift of traditional flying vehicles decreases substantially as the wing length of the vehicles decreases.

Numerous research groups are attempting to solve the problem of low aerodynamic lift in MAVs by developing a class of MAVs known as ornithopters, or flapping wing vehicles. The flapping wings of animals, and potentially new flapping wing MAVs, rely on translational motion, referred to as "flapping," and rotational motion, called "feathering," of their wings to develop unusually high lift. Thus, there is an interest in designing a lightweight, compact mechanism that enables wing flapping in an ornithopter that is inspired from the wing motion of hummingbirds and hovering insects.

SUMMARY OF THE INVENTION

One aspect of the invention comprises a mechanism for flapping a wing attached to a body. The mechanism comprises a wing structure comprising the wing and a wing spar having a feathering axis and coupled to a follower via a flexible member. A wing carrier is pivotally connected to the body about a flapping axis and configured to receive the wing spar, to restrain axial movement of the wing spar, and to permit rotation of the wing spar about the feathering axis. A biasing member having a first end attached to the wing spar and a second end attached to the wing carrier provides torsional bias to the wing spar. A guide attached to the body is positioned to lie in a path of the follower. A linkage, driven by an activator, transmits cyclic motion to propel the follower along the follower path. The follower and guide are shaped to interface with one another such that the wing spar has a first rotational position about the feathering axis along a first portion of the path and a second rotational position about the feathering along a second portion of the path. The interaction of the guide and the follower ideally provides the wing with a feathered configuration on an upstroke of the wing and a pronated configuration on a downstroke of the wing. In a vehicle having two wings, the linkage is adapted to drive both wings symmetrically and simultaneously.

Another aspect of the invention comprises a flying vehicle comprising a body, a pair of wings, and a mechanism for flapping the wings, the mechanism comprising a pair of wing structures, a pair of wing carriers, a pair of biasing members, and a pair of guides as described above, a linkage for transmitting cyclic motion to propel each wing follower along its respective follower path, and an activator for driving the linkage, wherein each follower and respective guide are shaped to interface with one another as described above. The linkage may comprise a four-bar linkage for driving both wings simultaneously.

The mechanism may be used to generate biaxial wing rotation for ornithopter applications using a single actuator to create rotation of each wing about two orthogonal axes (flapping and feathering). It may also have applications in other engineering areas. In one embodiment, the mechanism combines a four-bar mechanism with a novel spring loaded cam/follower mechanism to achieve this task, actuated by a single motor.

DETAILED DESCRIPTION OF THE INVENTION

Figure 1:
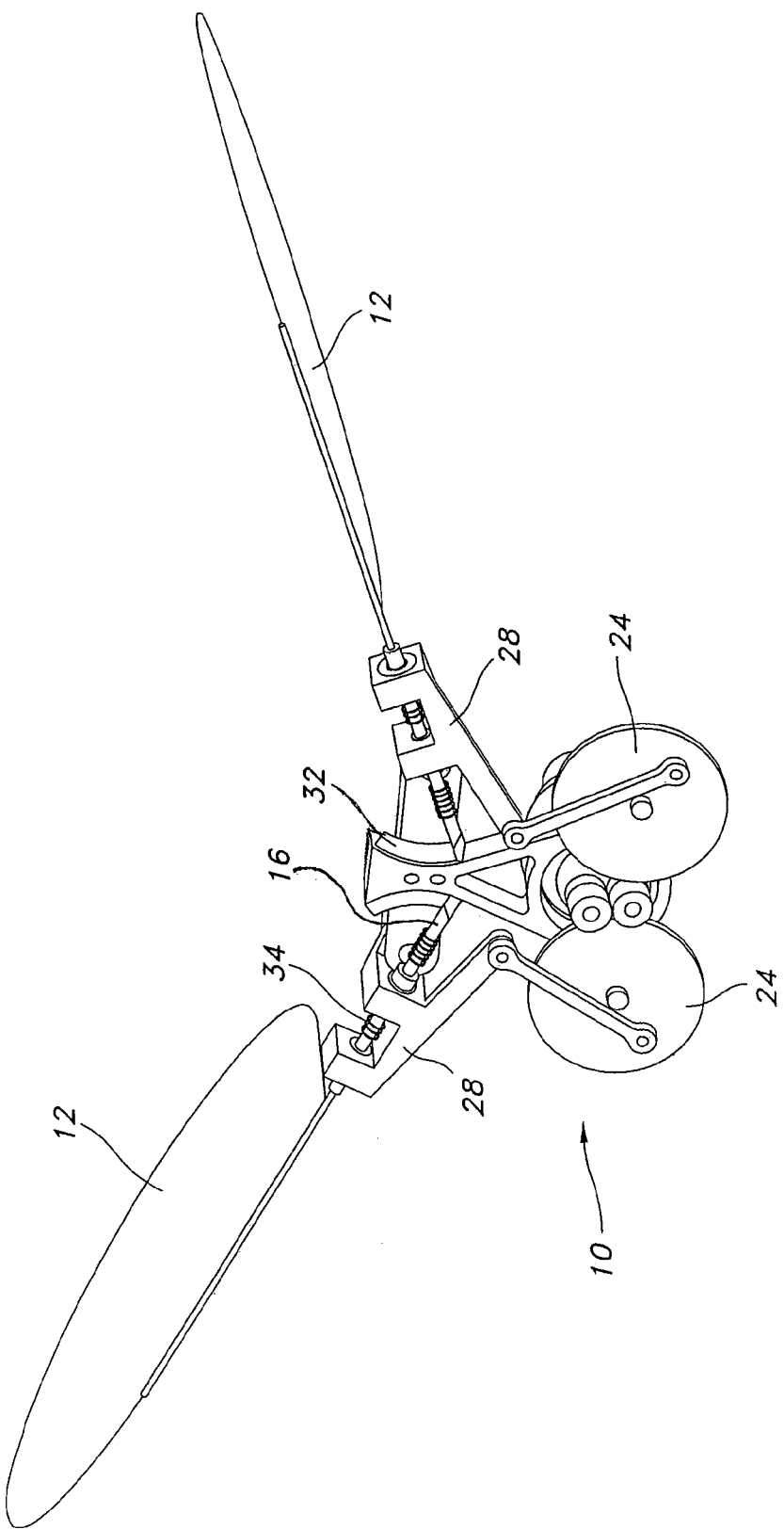
FIG. 1 is a side view perspective illustration of an exemplary flapping wing micro air vehicle (MAV) embodiment capable of achieving biaxial rotation of its wings using only a single electric motor.

In an attempt to mimic the wing motion of smaller birds and insects, designs of ornithopters that can rotate the wings about two orthogonal axes are described. An exemplary ornithopter 10 is shown in FIG. 1. The ornithopters described herein have an aerodynamically advantageous wing motion; a light-weight and compact mechanism design; and a minimum number of actuators. The designs described herein advantageously comprise a flapping mechanism that creates wing rotation about two orthogonal axes, using a single actuator to create rotations about both axes for both wings.

Figure 2:
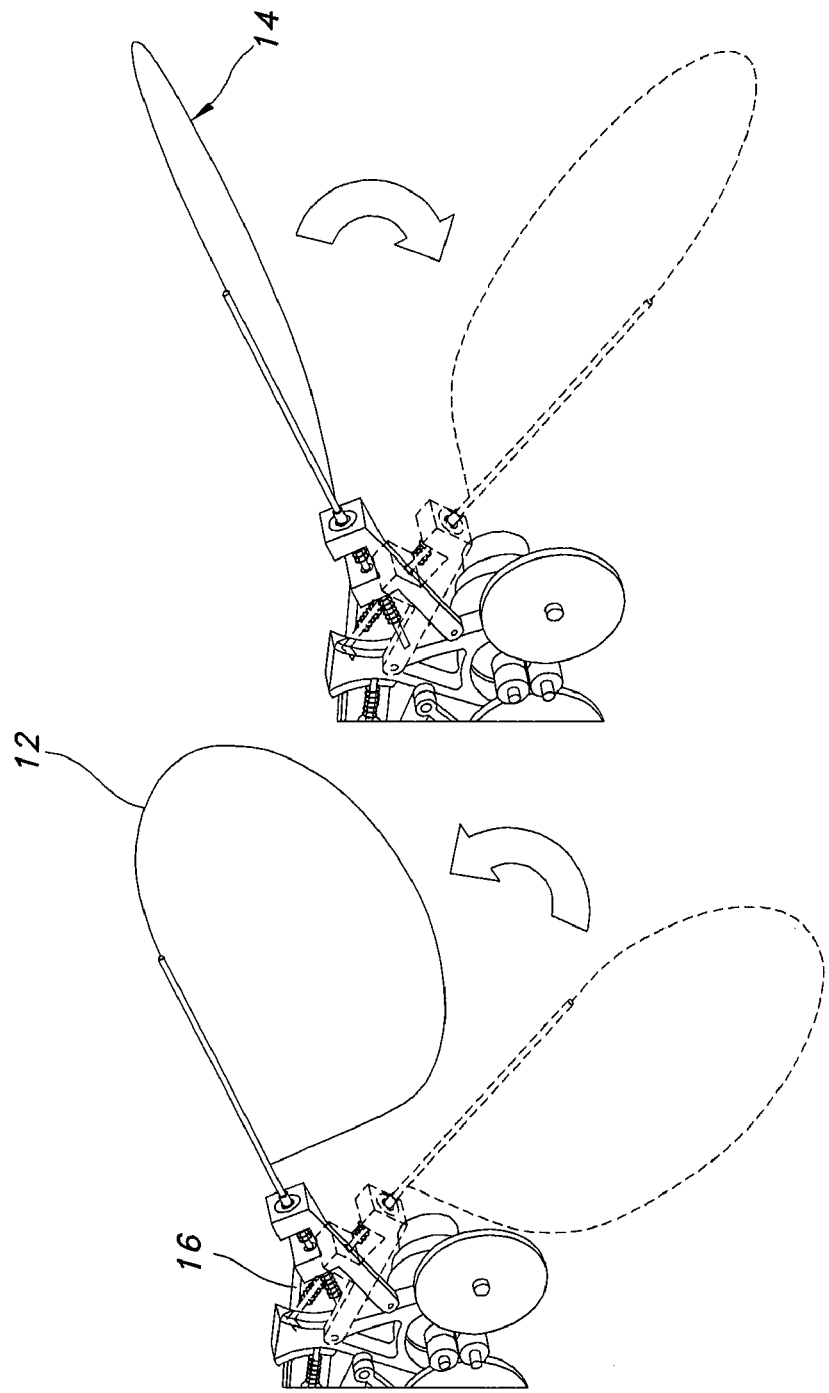
FIG. 2A is a detailed illustration of a wing of the MAV of FIG. 1, showing the motion during the upstroke while the wing is feathered.
FIG. 2B is a detailed illustration of the wing shown in FIG. 2A, during the downstroke when the wing is fully pronated.

The mechanism creates a motion similar to insects and hummingbirds by quickly rotating the wing at the top and bottom of the up and down stroke. FIGS. 2A and 2B illustrate this motion. While wing 12 is translating downwards during flapping, the wing's flat surface 14 is perpendicular to the direction of the wing motion, pulling the air along with it generating positive lift, as shown in FIG. 2B. At the bottom of the stroke, the wing quickly rotates, or feathers, by approximately 45 degrees about the feathering axis which is coaxial with wing spar 16. During the upstroke, the wing generates a negative lift. Since the wing has feathered, its effective surface area is reduced. Consequently, the magnitude of the negative lift during the upstroke is less than the positive lift generated during the down stroke. As a result, a net positive lift is generated. At the top of the stroke, the wing quickly rotates to its initial position and the process repeats during the next cycle.

Figure 3:
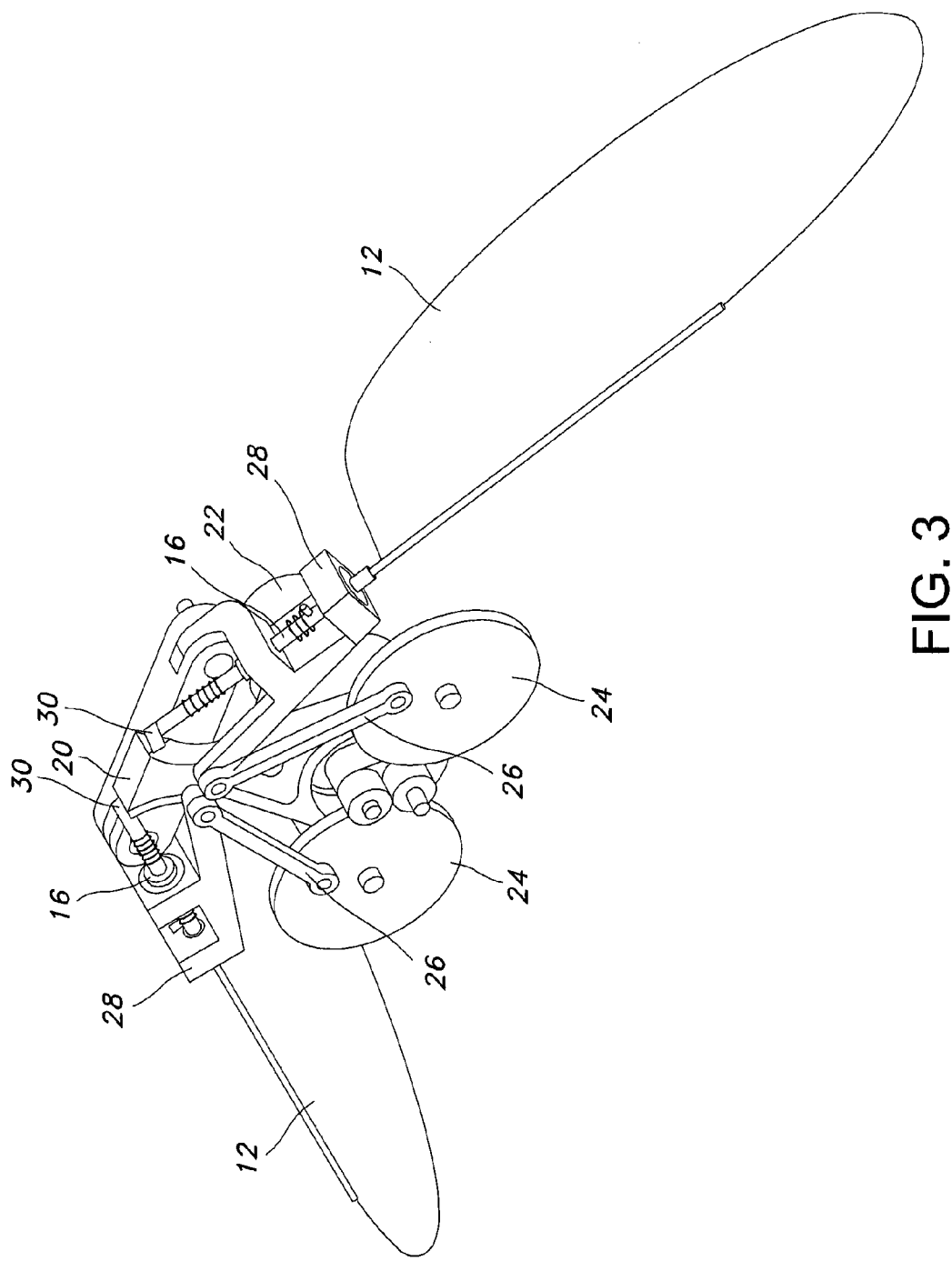
FIG. 3 is a three quarters view of the MAV of FIG. 1, with the wings rotated down and the follower rotated upward just above the guide.
Figure 4:
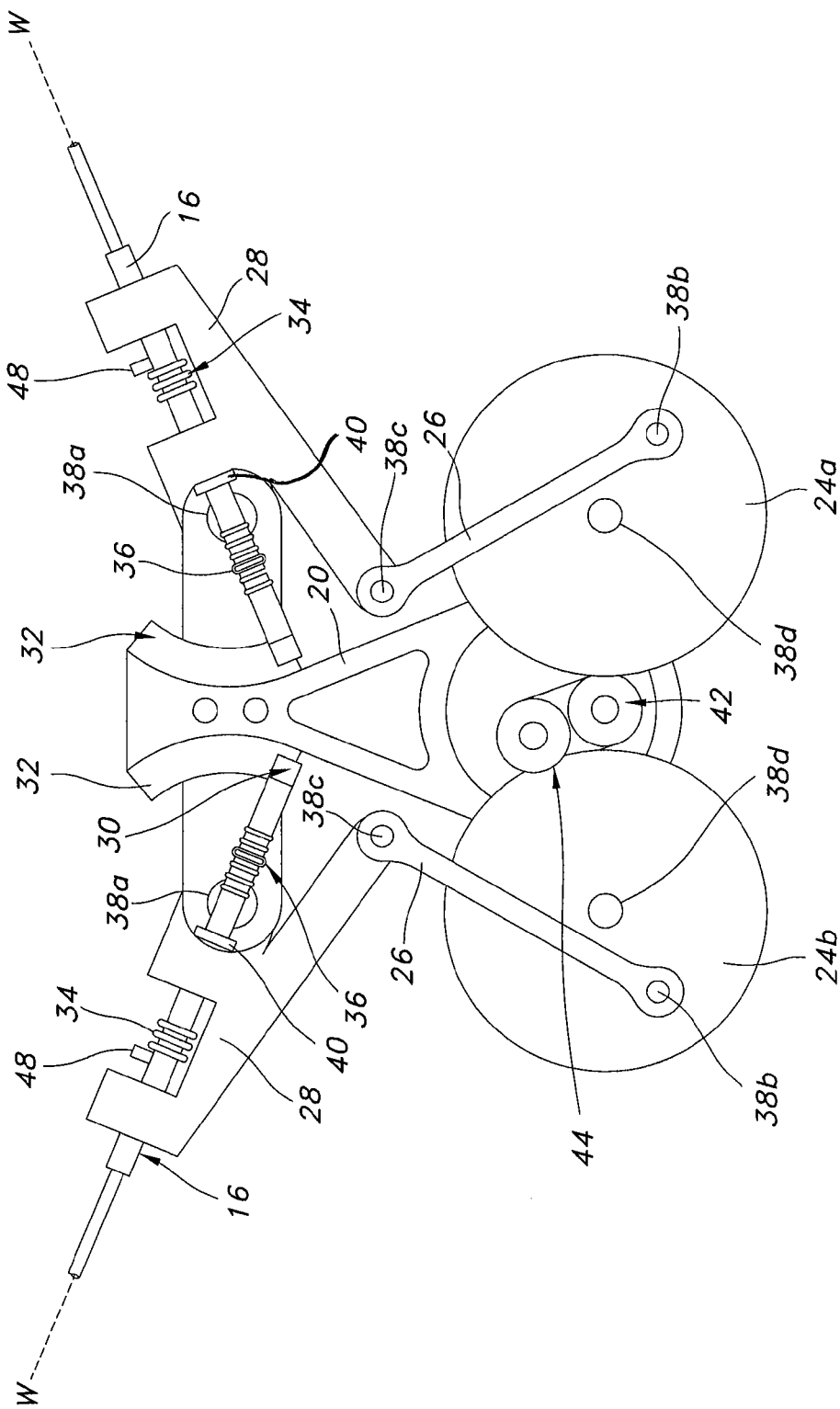
FIG. 4 is a front detailed view of a portion of the MAV of FIG. 1 showing an exemplary four-bar mechanism that drives the wings.
Figure 5:
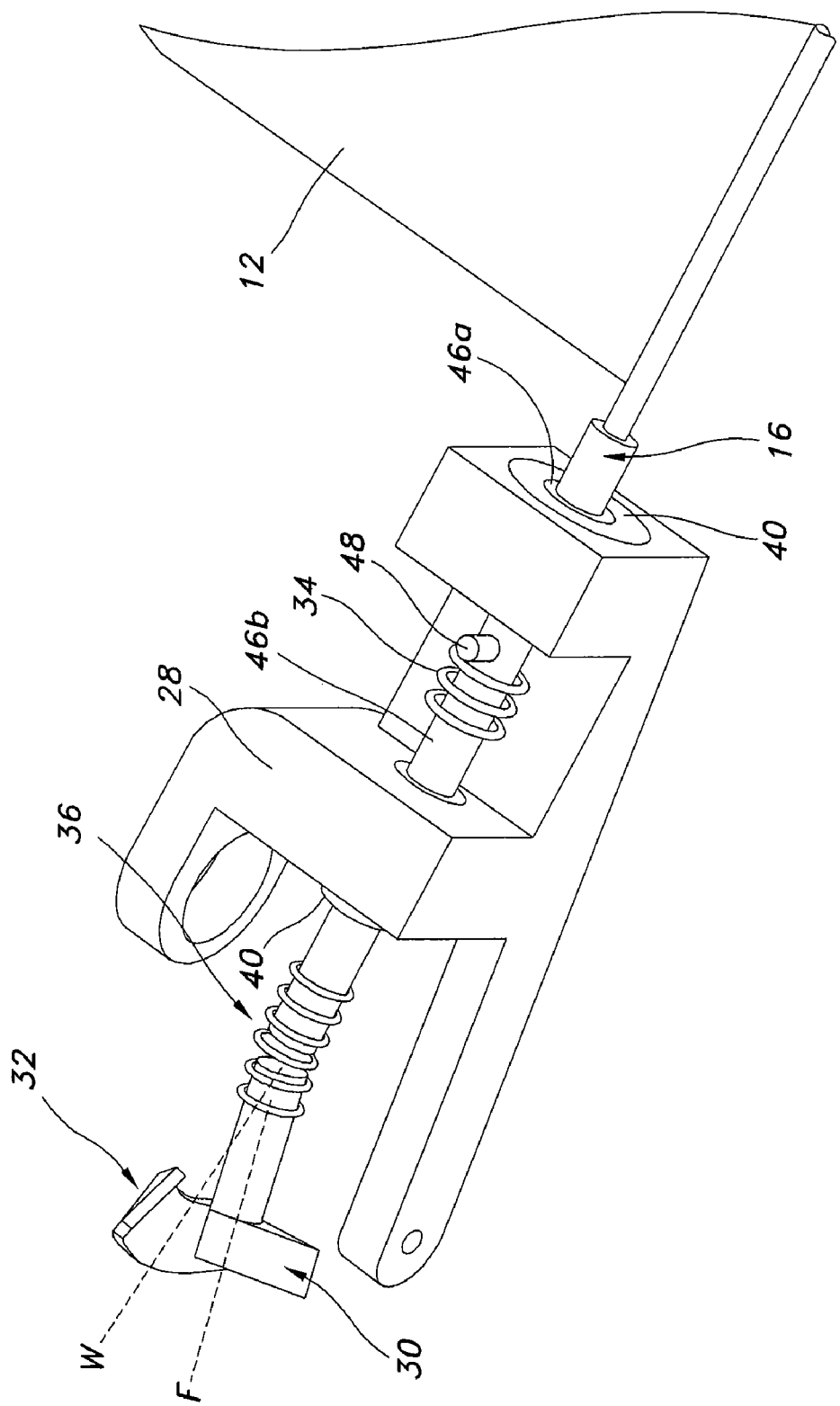
FIG. 5 is a detailed view of the wing carrier assembly of the MAV of FIG. 1.

The exemplary mechanism as shown in FIGS. 3, 4 and 5, consists of a body 20, a motor 22, two gear wheels 24a and 24b, two connecting rods 26, two wing carriers 28, two wing spars 16 with a wing 12 and a follower 30 attached to opposite ends. Two guides 32 are fixed to the body. Two torsion springs 34 and two bending springs 36 provide bias to the wing spars. The bending springs may comprise, for example, helical compression springs.

Wing carrier 28 supports wing spar 16 and attaches to body 20 by a pin joint 38. Wing spar 16 rotates freely within the housing of wing carrier 28 but stops 40 prevent it from sliding laterally. Connecting rod 26 attaches to wing carrier 28 and gear wheel 24a or 24b by two pin joints 38b, 38c at opposite ends. Gear wheels 24a and 24b are pinned to the body at pin joints 38d. While the motor gear 42 attached to motor 22 drives right gear wheel 24a directly, it indirectly drives left gear wheel 24b through an idler gear 44. This system ensures symmetric and simultaneous flapping of the wings by rotating the gear wheels in opposite directions.

The wing spar assembly has three degrees-of-freedom: rotation about pin joint 38a that connects wing carrier 28 to body 20 (flapping axis), rotation about axis W of wing spar 16 (feathering axis), and deflection of bending spring 36 moving follower 30 out of alignment with wing spar 16. Bending spring 36 acts as a coupler connecting follower 30 to wing spar 16. Bending spring 36 creates a rigid connection in torsion but allows for some misalignment of the wing spar (feathering) axis W and follower axis F, as shown in FIG. 5.

The exemplary mechanism shown in FIG. 4 that creates the major flapping of the wings comprises a simple four-bar linkage. Motor 22 turns two gear wheels 24a, 24b (input crank), which in turn move connecting rods 26 (couplers) up and down. Connecting rods 26 are pinned to wing carriers 28, thus rotating the wing carriers and wing spars 16 (rocker) in a reciprocating manner about the flapping axis.

Figure 6:
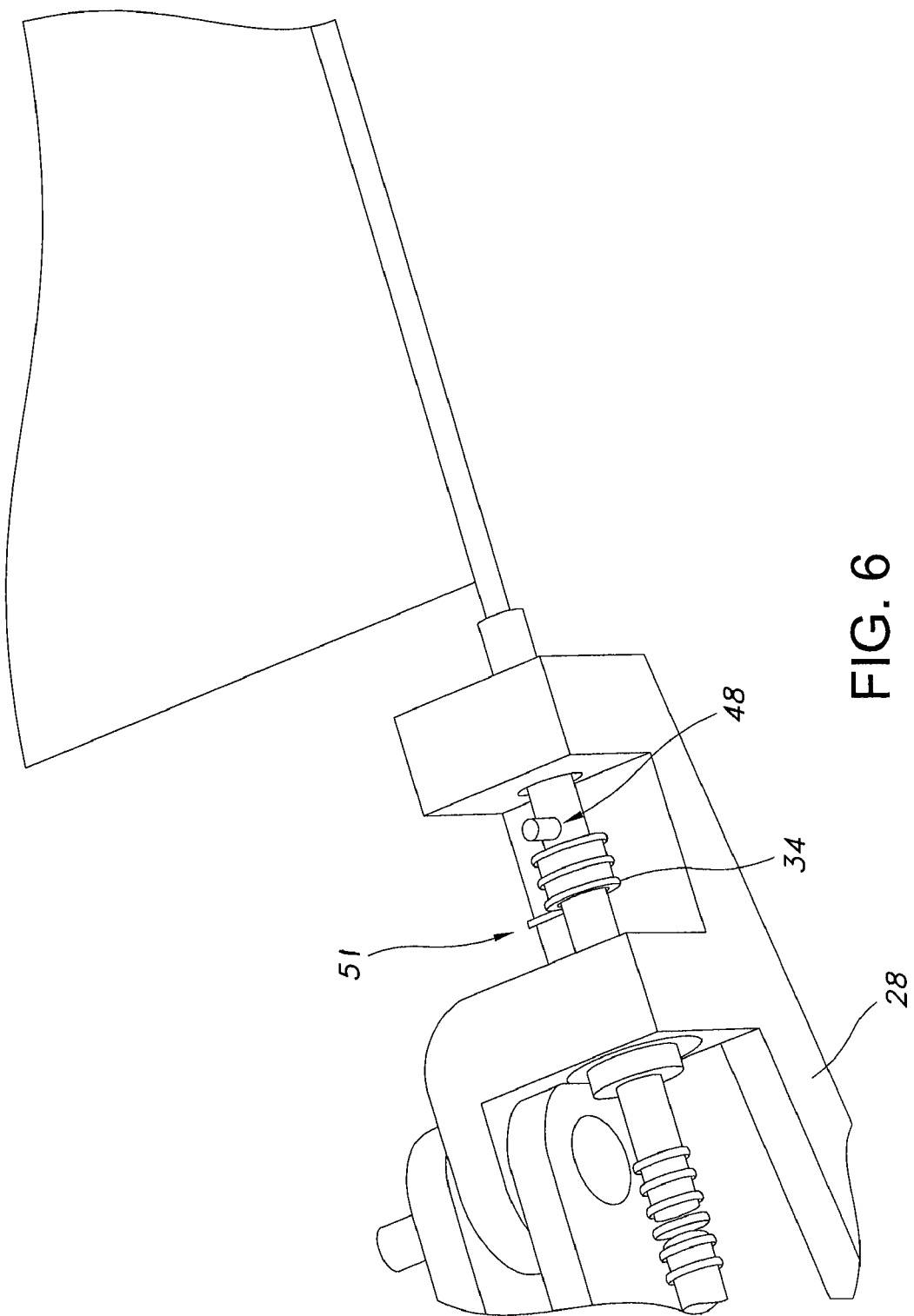
FIG. 6 is a detailed view of one embodiment for connecting the torsion spring.

The mechanism that creates the feathering motion is a cam-follower system. It comprises torsion spring 34, bending spring 36, follower 30, and guide 32. Torsion spring 34 is located near the center of wing carrier 28 between the two bearings 46a, 46b that support the wing spar. Wing spar 16 passes through the center of torsion spring 34. In one embodiment, shown in FIG. 6, one end of the torsion spring attaches to a small pin 48 that protrudes from the wing spar, while the other end 51 attaches to wing carrier 28. In this way, as wing spar 16 rotates relative to the wing carrier 28, torsion spring 34 is compressed and creates a moment about the wing spar axis. When the external force causing the rotation of the wing spar is removed, the torsion spring returns the wing spar to its original pronated position.

Bending spring 36 acts as a coupler connecting follower 30 to wing spar 16. Bending spring 36 allows for a slight misalignment of follower 30 while still transferring a moment from follower 30 to the wing spar 16. Bending spring 36 has a second function of creating a moment that keeps follower 30 in contact with guide 32. Bending spring 36 is unstretched when follower axis F is in line with the wing spar axis W. Although, shown and described as a bending spring, any resilient member that biases the follower axis to align with the wing spar axis may be used.

Figure 7:
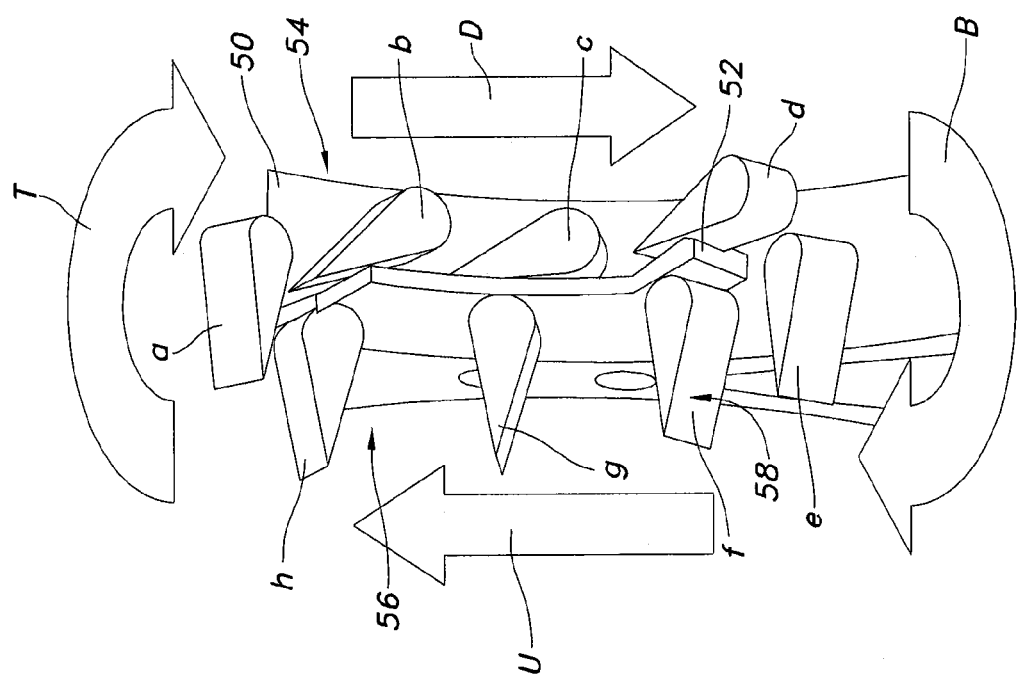
FIG. 7 is a detailed view of the follower path around the guide.

Guide 32 comprises a narrow ridge attached to body 20 of the ornithopter and is positioned so that it lies in the path of follower 30, as illustrated in FIG. 7. The top edge 50 of guide 32 lies slightly in front of the follower axis and its bottom edge 52 lies slightly behind the follower axis. The slightly slanted portions of the guide at its opposite ends force follower 30 to move along the back side 54 of guide 32 while moving downwards in the direction of arrow D and to move along the front side 56 of guide 32 while moving upwards in the direction of arrow U.

The follower motion is illustrated in FIG. 7 by showing the follower in various positions a-h along follower path illustrated by arrows T, D, B, and U. The follower begins slightly above top edge 50 of guide 32 as in position a. As the follower moves down, it contacts the guide in positions b, c, and d. This contact occurs on flange 58 (the pointed end) of the follower, forcing the follower to rotate about the feathering axis, consequently rotating the entire wing. Follower 30 then slides down back edge 54 of guide 32 with torsion spring 34 compressed. Bending spring 36 forces follower 30 to remain in contact with guide 32 until the follower moves below bottom edge 52 of guide 32 in position e. At this point, the forces acting on bending spring 36 and torsion spring 34 are released, and the spring biases cause wing 12 to rotate into its original, fully-pronated position, realigning follower axis F with wing spar axis W. Next, follower 30 reverses direction and contacts bottom edge 52 of guide 32 in position f. This time follower 30 is forced to move along front edge 56 of guide 32 through positions g and h, but with no flange on the back side of the follower, the wing remains fully pronated.

To test the described mechanism, three individual prototypes were created, named MHP I, MHP II, and MHP III. MHP II had a wingspan of 60 cm, a weight of 40 grams, and a flap rate of approximately 1.5 Hz. MHP III had a wingspan of only 48 cm, a weight of 50 grams (the extra weight is due to added sensors on the machine), and a flap rate of 4 Hz. These dimensions are merely exemplary, however, and larger or smaller dimensions can be chosen, as desired.

The prototypes comprised a body formed of DELRIN® acetal resin, with integral DELRIN® acetal resin guides, nylon fabric wings attached to carbon fiber wing spars, a DELRIN® acetal resin follower attached to the wing spar by a small compression spring acting as the bending spring, DELRIN® acetal resin connecting rods, a DELRIN® acetal resin wing carrier, nylon gear wheels, and a small DC motor. The materials discussed above are merely exemplary materials, however, and similar mechanisms and vehicles may be created using any materials known in the art.

Figure 8B:
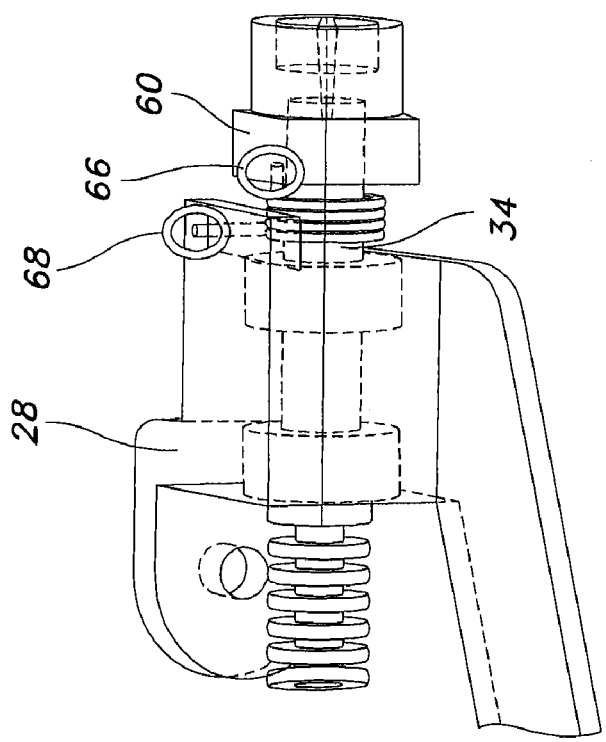
FIG. 8B is a detailed illustration of torsion spring attachment points (circled) in a second exemplary ornithopter embodiment.
Figure 8A:
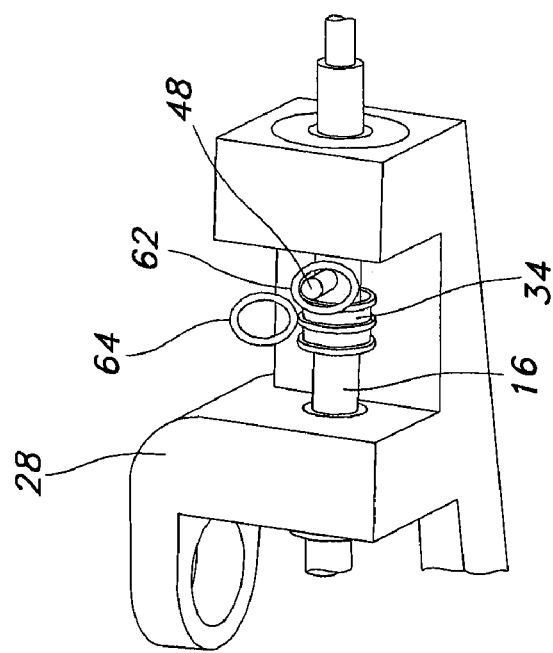
FIG. 8A is a detailed illustration of torsion spring attachment points (circled) in a first exemplary ornithopter embodiment, similar to that shown in FIG. 6.

The only significant design difference between the MHP II and MHP III prototypes, illustrated in FIGS. 8A and 8B, was the way in which torsion spring 34 was attached to wing spar 16. In the MHP II prototype shown in FIG. 8A, and one end 62 of torsion spring 34 was attached to wing spar 16 via pin 48 in the wing spar, and the other end 64 of torsion spring 34 was attached to wing carrier 28 through a hole (not shown) drilled into the wing carrier. In MHP III, one end 66 of the torsion spring 34 was attached to wing spar 16 via a small hole in hub 60 attached to the wing spar as shown in FIG. 8B, and the opposite end 68 was attached to wing carrier 28 though a hole (not shown). The differences between these connections is believed to have had a drastic impact on the generated lift, as discussed herein later.

Theoretical and Experimental Results

A computer program was developed conforming to a dynamic and aerodynamic model developed for the exemplary ornithopter. The model assumed a wing shape of a quarter ellipse with its minor axis measuring 0.14 meters and major axis 0.30 meters. The wing kinematics examined lift and flap rates consistent with those achievable by MHP II and MHP III.

In order to correlate with the theoretical results, a series of experiments were performed on MHP II to measure the actual force generated by the wings at various flap rates and the necessary power to run the mechanism. Similar experiments were run on MHP III. Detailed information regarding the dynamic and aerodynamic models, and the experimental results, can be found in "Design of A Mechanism for Biaxial Rotation of a Wing for a Hovering Vehicle, IEEE Trans. on Mechatronics," April 2006, vol. 2, NO. 2 incorporated herein by reference.

Forces in the x, y, and z directions were measured at 6 different voltage levels corresponding to 6 different flap rates for MHP II, with the force in the z direction (lift) being the measurement of most interest. As predicted by the theoretical model, the experimental data showed that lift increases with the flap rate, as shown in Table 1. Forces generated in the x and y directions were small compared to the z direction, but they were sizable enough to potentially cause perturbations in the lateral motion of a flying prototype.

TABLE 1

| Flap Rate | $F_z$ |
|---|---|
| 1.2 Hz | 0.316 N |
| 1.4 Hz | 0.335 N |
| 1.5 Hz | 0.456 N |
| 1.7 Hz | 0.500 N |
| 1.9 Hz | 0.548 N |

Figures 9A, 9B:
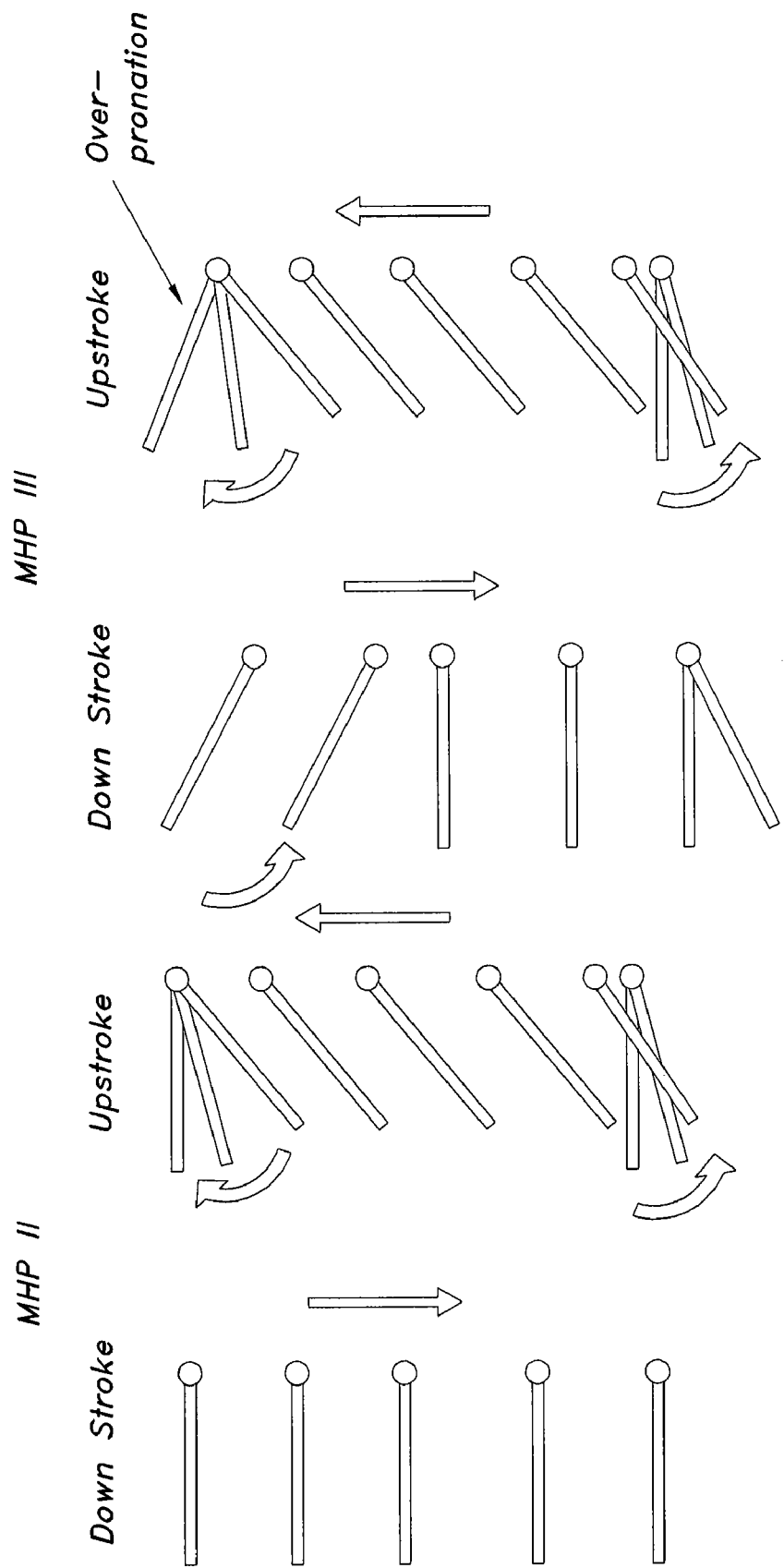
FIG. 9A is a schematic illustration showing exemplary wing motion for a first embodiment of the invention.
FIG. 9B is a schematic illustration showing exemplary wing motion for a second embodiment of the invention.

Data collection for the MHP III showed that although MHP III was able to flap its wings much faster then the MHP II, it did not generate nearly as much lift. In fact, the majority of the forces generated with this prototype were in the x and y directions. This result is believed to have been caused by a slight variation in the feathering motion of the wing in the MHP III design as compared to the MHP II design, caused by the differences in how torsion spring 34 was connected to wing spar 16. During the top of the upstroke in the MHP II prototype illustrated in FIG. 8A, pin 48 prevented wing 12 from over rotation. Pin 48 is not present in the MHP III design, so consequently, the wing was able to over-pronate at the end of the upstroke, reducing the wing's effective surface area during the down stroke. The respective wing motions of MHP II and MHP III are shown in FIGS. 9A and 9B, for comparison.

Thus, although both the MHP II and MHP III embodiments provided acceptable lift, the differences in these embodiments highlights the benefits of providing a structure that prevents over-pronation of the wing on the end of the upstroke. Although pin 48 protruding from wing spar 16 provides one embodiment that prevents over pronation, any structure that provides a mechanical stop to prevent overpronation may be used for providing this design advantage.

Thus, the claimed invention provides a novel mechanism to actuate the wings of a hovering micro air vehicle (MAV). The mechanism uses a single actuator, but each wing can rotate about two orthogonal axes. The light-weight, compact mechanism for flapping the wings, inspired from the wing motion of hummingbird and hovering insects, is capable of generating enough lift for a vehicle to hover.

It should be noted that although ideal for designing a flying vehicle or ornithopter having two wings, the mechanisms described herein are not limited to use in flying vehicles. Any application in which it is desired to create a flapping motion of one or two wings may benefit from the teachings of this invention. For example, such a flapping motion may be used to provide propulsion for an underwater vehicle, or, if the flapping wing is attached to a fixed body, to provide an air current.

Thus, although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A mechanism for flapping a wing attached to a body, the mechanism comprising:
    a wing structure comprising the wing and a wing spar having a feathering axis, the wing spar coupled to a follower via a resilient member;
    a wing carrier pivotally connected to the body about a flapping axis and configured to receive the wing spar, to restrain axial movement of the wing spar, and to permit rotation of the wing spar about the feathering axis;
    a biasing member having a first end attached to the wing spar and a second end attached to the wing carrier for providing a torsional bias to the wing spar;
    a guide attached to the body and positioned to lie in a path of the follower;
    a linkage for transmitting cyclic motion to rotate the wing carrier about the flapping axis, and thereby cause the follower to move along the follower path; and
    an actuator for driving the linkage;
    wherein the follower and guide are shaped to interface with one another such that the wing spar has a first rotational position about the feathering axis along a first portion of the follower path and a second rotational position about the feathering axis along a second portion of the follower path.

2. The mechanism of claim 1, wherein the body has two attached wings and the linkage is configured to drive both wings symmetrically and simultaneously using a single actuator.

3. The mechanism of claim 1, wherein the guide and the follower are shaped to provide the wing with a feathered configuration on an upstroke of the wing and a pronated configuration on a downstroke of the wing.

4. The mechanism of claim 3, wherein the follower comprises a flanged side and a non-flanged side, the guide having a front side, a back side, a top portion, and a bottom portion, the top portion slanted toward the back side and the bottom portion slanted toward the front side, the follower path configured so that the non-flanged side of the follower travels adjacent the front side of the guide on an upstroke and the flanged side of the follower travels adjacent the back side of the guide on a downstroke, the resilient member biasing the follower toward the guide and the biasing member biasing the wing spar toward the first rotational configuration.

5. The mechanism of claim 4, wherein the biasing member comprises a torsional spring through which the wing spar is coaxially mounted, and the resilient member comprises a bending spring that receives the wing spar through one end and receives the follower through an opposite end.

6. The mechanism of claim 1, further comprising a mechanical stop positioned to prevent overpronation of the wing spar.

7. A vehicle comprising a body, a pair of wings, and a mechanism for flapping the wings, the mechanism comprising:
- a pair of wing structures, each comprising one of the wings attached to a wing spar, the wing spar having a feathering axis and coupled to a follower via a resilient member;
- a pair of wing carriers, each pivotally connected to the body about a flapping axis and configured to receive the wing spar, to restrain axial movement of the wing spar, and to permit rotation of the wing spar about the feathering axis;
- a pair of biasing members, each having a first end attached to one of the wing spars and a second end attached to one of the wing carriers for providing a torsional bias to the attached wing spar;
- a pair of guides attached to the body of the vehicle, each guide positioned to lie in a path of one of the followers;
- a linkage for transmitting cyclic motion to rotate the wing carriers about their respective flapping axes and thereby cause the followers to move along their respective follower paths; and
- an actuator for driving the linkage;

wherein each follower and corresponding guide are shaped to interface with one another such that each wing spar has a first rotational position about its feathering axis along a first portion of its respective follower path and a second rotational position about its feathering axis along a second portion of its respective follower path.

8. The mechanism of claim 7, wherein the linkage comprises a four-bar linkage for driving both wings symmetrically and simultaneously.

9. The mechanism of claim 8, wherein the actuator comprises a motor and the four-bar linkage comprises:
- a motor gear connected to the motor;
- an idler gear identical in diameter to and meshed with the motor gear such that the motor gear drives the idler gear in an opposite rotational direction from the motor gear;
- a pair of gear wheels comprising a first gear wheel meshed with the motor gear and a second gear wheel meshed with the idler gear;
- a first connecting rod having a first end pinned to a first wing carrier and a second end pinned to a radial location on the first gear wheel; and
- a second connecting rod having a first end pinned to a second wing carrier and a second end pinned to a radial location on the second gear wheel.

* * * * *